July 4, 1939. F. A. FIRESTONE Re. 21,137

ORGAN

Original Filed June 19, 1929 3 Sheets-Sheet 1

INVENTOR
FLOYD A. FIRESTONE
BY
James A. G. Koehl
ATTORNEY

ORGAN

Original Filed June 19, 1929 3 Sheets-Sheet 2

INVENTOR
FLOYD A. FIRESTONE
BY
James A. G. Koehl
ATTORNEY

July 4, 1939. F. A. FIRESTONE Re. 21,137

ORGAN

Original Filed June 19, 1929 3 Sheets-Sheet 3

INVENTOR
FLOYD A. FIRESTONE
BY
James A. G. Koehler
ATTORNEY

Reissued July 4, 1939

Re. 21,137

UNITED STATES PATENT OFFICE 21,137

ORGAN

Floyd A. Firestone, Ann Arbor, Mich., assignor to Central Commercial Company, Chicago, Ill., a corporation of Illinois Original No. 1,953,753, dated April 3, 1934, Serial No. 372,200, June 19, 1929. Application for reissue March 9, 1936, Serial No. 67,991

57 Claims. (Cl. 84—1)

Figure 1B:
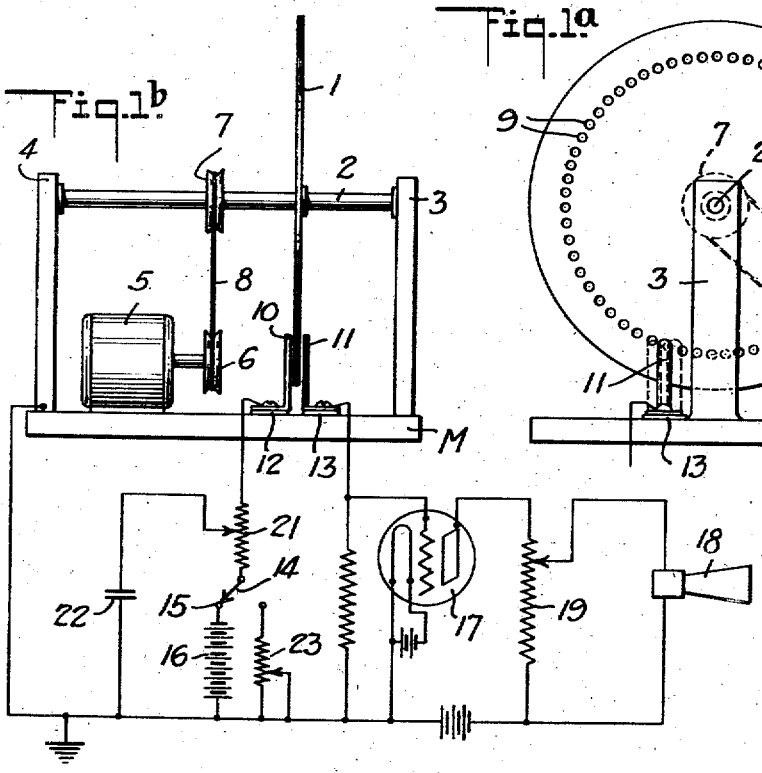

This invention relates to an improvement in organs wherein the sound is produced by the generation of alternating currents of the proper frequency which currents are amplified and applied to a loud speaker. The objects of the improvements are to obtain an organ of greater tonal possibilities, more compact, and less expensive than the present compressed air organ.

The compressed air organ as usually built uses a separate set of pipes for each tone quality; thus, there is a full scale of pipes for imitating the clarinet tone, another for the trumpet, another for the flute, etc. A complete organ consists of about six thousand pipes together with the necessary equipment for supplying compressed air at different pressures. This equipment occupies a very large amount of space and costs $50,000 or more. Furthermore, its variety of tone qualities is limited by the inventiveness of the designers in producing pipes; many orchestral instruments have never been successfully imitated by the organ. My organ consists of one set of equipment which can by suitable manipulation imitate the tone of any musical instrument; it is less expensive to construct than the compressed air organ and requires only as much space as a grand piano.

A musical tone consists of a fundamental tone and a number of harmonics. The pitch of the musical tone is determined by the number of vibrations per second, commonly called the frequency, constituting the fundamental tone. The harmonics have frequencies which are integral multiples of the fundamental frequency. Thus, if the fundamental frequency is 200 cycles per second, the second harmonic frequency will be 400, the third harmonic frequency 600, etc. The quality of a musical sound is that characteristic which enables us to distinguish the sound of the clarinet from that of the violin, or the piano from the banjo. The quality is determined by the intensity of the harmonics relative to the fundamental; by the rate at which the intensity of the fundamental and harmonics grows and decays at the beginning and end of a note, commonly called the attack; and by the accompanying noises such as the hiss of the violin bow or the clarinetist's breath. My invention provides means by which the above three factors which determine the tone quality may be controlled at will by the performer. It is at present held by many authorities that the phase of the harmonics relative to the fundamental and to each other does not affect the tone quality but if the reverse should be found to be true it is also possible for me to control the relative phases of the various component tones.

My device contains a separate alternating current generator for each fundamental and each harmonic of all the notes of the organ. These generators are controlled by the keys on the keyboard of the console. (The console is that part of an organ which comprises the keyboards of the various manuals; the pedal keyboard, if any; and the necessary controls, if any, for regulating the loudness and tone quality of the notes produced.) The currents are then amplified if necessary with a vacuum tube amplifier whose amplification is continuously variable for controlling the loudness; the amplified currents are applied to a loud speaker capable of converting electrical energy into acoustical energy.

Let us now consider what frequencies of alternating current must be produced in order to sound all of the C's on the organ including their harmonics. There are on the organ 9 C's having the following frequencies in cycles per second: 16, 32, 64, 128, 256, 512, 1024, 2048, and 4096. The lowest of these would have a fundamental and harmonics of the following frequencies: 16, 32, 48, 64, 80, 96, 112, 128, 144, etc. Some of these harmonic frequencies are the same as the fundamental frequencies of the other C's while some are different. The note having a 32 cycle fundamental has frequencies of 32, 64, 96, 128, 160, etc. Some of these harmonic frequencies are the same as those in the previous list for the 16 cycle fundamental. Thus, when one considers the 9 C's and, say, 20 harmonics of each, leaving out those harmonics having frequencies higher than 4096 cycles he finds that about 60 different frequencies are required. For the C sharps, 60 more different frequencies must be produced. Since there are twelve notes in one octave the production of all the notes in the scale with their first twenty harmonics, leaving out the harmonics above 10,000 cycles would require 720 frequencies. It is obvious that if the device is to be commercially practicable each generator must be extremely simple.

Figure 1A:
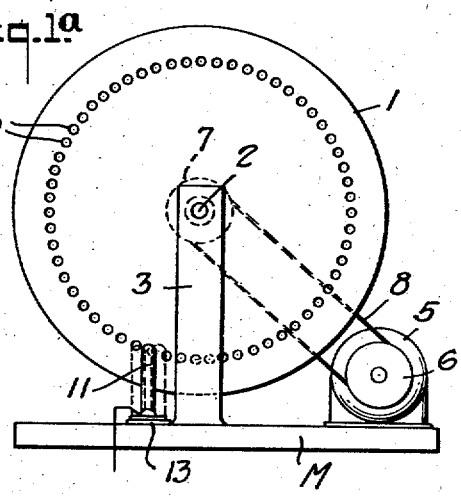
Figure 3:
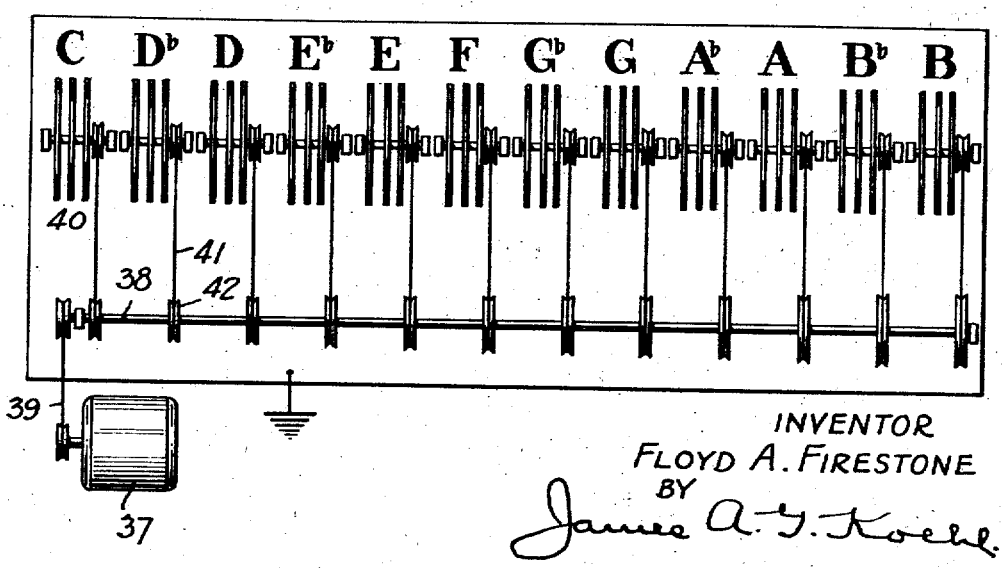
Figure 2C:
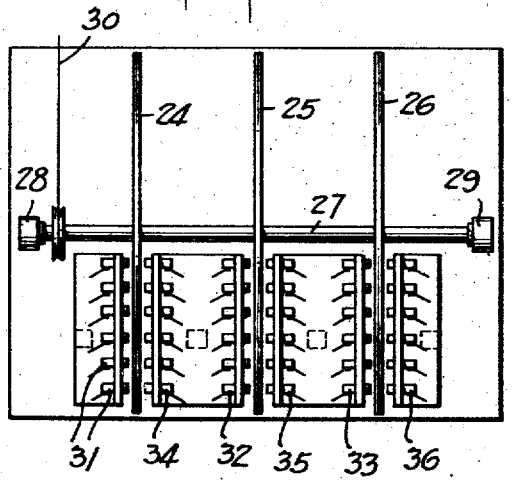
Figure 2B:
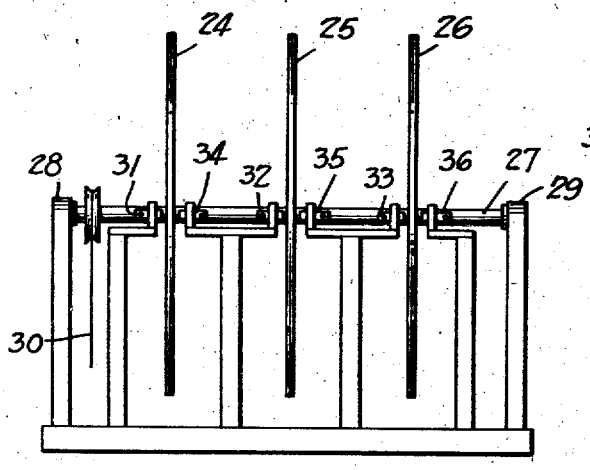
Figure 2A:
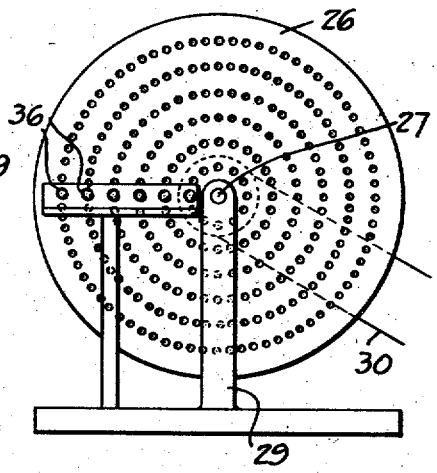
Figure 4:
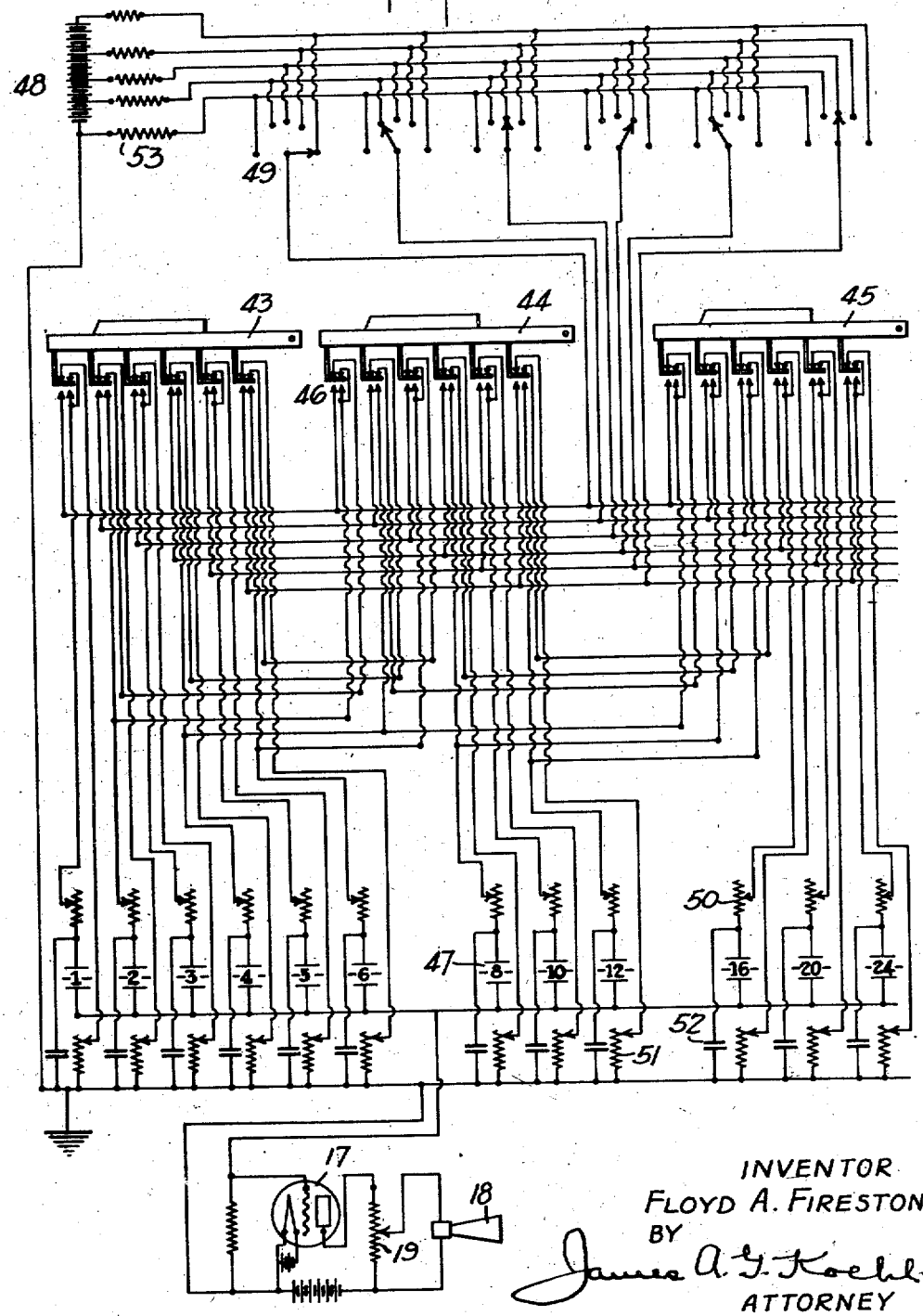

Figs. 1*a* and 1*b* illustrate the principle of a single alternating current generator, which principle may be used in applying my invention. Figs. 2*a*, 2*b*, and 2*c* show a practical combination of a large number of alternating current generators utilizing the above principle. Fig. 3 shows the method of driving a number of similar groups of generators to produce all the frequencies needed in producing the notes of the musical scale. Fig. 4 gives the wiring diagram of a typical portion of the complete organ.

For purposes of sound production no distinction need be made between alternating current and direct current with alternating current superposed. A simple alternating current generator capable of producing sufficient voltage to actuate the grid circuit of a vacuum tube can be produced in many different ways, but the method which I prefer is shown in principle in Fig. 1*b*. A rotating metallic disc 1 on a shaft 2 is mounted in bearings 3 and 4 and driven by the synchronous motor 5 through the pulleys 6 and 7 and belt 8. Around the disc is a row of equally spaced holes 9. Two strips of metal 10 and 11 called inductors are mounted on insulating blocks 12 and 13 in such a manner that the holes 9 run close to them. If the switch 14 is closed on point 15 the battery 16 will charge the inductor 10. Owing to the electrostatic capacity between inductor 10 and inductor 11 through the holes 9 the potential of the inductor 11 will always be greater when it is opposite a hole 9 than when it is opposite the grounded metallic disc 1 between the holes 9. Thus an alternating potential will be developed on the inductor 11 having the frequency with which holes 9 pass the inductor 11. By properly shaping the inductor 11 and adjusting its distance from the holes 9 a pure wave free from harmonics can be obtained. The voltage thus generated may be taken to the conventional vacuum tube amplifier 17 which is connected to the loud speaker 18 through the potentiometer 19. The rate at which the generator builds up its voltage when the switch 14 is closed is governed by the resistance 21 and the condenser 22. The inductor 10 does not arrive at the full voltage of the battery until the battery has charged the condenser 22 through the resistance 21. It is well known that the time in seconds required to charge a condenser through a resistance is roughly equal to the product of the capacity in farads and the resistance in ohms. Thus by adjusting the resistance 21 the generator may be made to build up its voltage instantly or gradually over a period of several seconds. To stop the generation of voltage it is necessary to discharge inductor 10. This is done through the resistances 23 and 21 by whose regulation the inductor 10 can be discharged instantly or gradually. Experiment has shown that if the inductor 10 is charged to 200 volts the inductor 11 will deliver about 0.05 volts alternating current to the amplifier 17, a value ample for the operation of an amplifier.

The final form of generator group shown in Figs. 2*a*, 2*b* and 2*c* is arrived at by the expansion of the principle of Fig. 1*a* by the use of three discs on one shaft, each disc having many rows of holes and each row of holes having one inductor on each side of and close to the disc. For simplicity each disc in Fig. 2*a* is drawn with only 6 rows of holes although in practice a larger number is required as explained fully further on in this paragraph. 24, 25 and 26 are the three metallic discs which are fixed to the shaft 27. Shaft 27 is mounted in the bearings 28 and 29 and is driven by belt 30. 31, 32, and 33 are the insulated primary inductor groups to which the direct polarizing voltage is applied, there being a separate insulated metallic inductor plug for each row of holes. 34, 35, and 36 are the corresponding insulated secondary inductor groups from which the alternating currents are derived, there being a separate insulated metallic inductor plug for each row of holes. Arranged in any convenient manner on discs 24, 25, and 26 are concentric circular rows of holes, there being one each of rows having the following numbers of holes: 1, 2, 3, 5, 6, 7, 8, 9, 10, 11, 12, 13, 14, 15, 16, 17, 18, 19 20 22, 24, 26, 28, 30, 32, 34, 36, 38, 40, 44, 48, 52, 56, 60, 64, 68, 72, 76, 80, 88, 96, 104, 112, 120, 128, 136, 144, 152, 160, 176, 192, 208, 224, 240, 256, 272, 288, 304, and 320. The purpose of using three discs 24, 25, and 26 is merely to have sufficient room for so many rows of holes. The rows which generate the fundamental frequencies in the above group have the following numbers of holes: 1, 2, 4, 8, 16, 32, 64, 128, and 256. The rest of the rows are necessary for providing the 20 harmonics of each of these fundamentals, all rows having more than 320 holes having been omitted as being of too high a frequency.

If the generator group of Fig. 2*c* is driven at 16.00 revolutions per second it is capable of producing all the frequencies necessary for all the C's of the scale and all their necessary harmonics. An exactly similar generator group if driven at a speed of 16.95 revolutions per second is capable of producing all the frequencies necessary for all the C sharps of the scale and all their necessary harmonics. The frequencies of all the notes of the musical scale and all their necessary harmonics can be produced by 12 similar generator groups running at the following speeds in revolutions per second: 16.00, 16.95, 17.96, 19.02, 20.15, 21.35, 22.62, 23.97, 25.39, 26.90, 28.50, and 30.19. The foregoing numbers are in the relation of the frequencies of the equitempered scale each being larger than the one just preceding by the twelfth root of 2.

Fig. 3 shows schematically the entire generator assembly. The synchronous motor 37 drives the line shaft 38 through the belt 39. This line shaft drives the twelve generator groups 40 through the belts 41 each pulley 42 being of such size as to drive its generator group at one of the speeds listed above. In operation the metal parts of all generators are grounded.

Fig. 4 shows a schematic diagram of the manner in which the generators are connected into the circuit so as to allow the musician to control them from the keyboard. 43 is the lowest C key on the keyboard; 44 is the next higher C key and 45 the next higher C above 44. These keys are provided with a multiplicity of contacts 46 arranged as shown so that when the key is depressed the primary inductors of the generators 47 are connected to the polarizing battery 48 through the voltage selecting switches 49 and the variable resistors 50; but when the keys are released the primary inductors of generators 47 are connected to ground through the variable resistors 50 and 51. The contacts on each key of course connect with those generators with frequencies appropriate to the fundamental and harmonics of that particular note in the scale. The symbol which has been chosen to represent these electrostatic generators in the diagram is that for a condenser with a numeral in the center which indicates the number of holes in the row of that particular generator. It will be noted from the drawings that the 1 hole generator is controlled by the fundamental contact on the lowest key, 43. The two hole generator is controlled by the second harmonic contact on key 43 and also by the fundamental contact on key 44. The connections are so arranged that if either key is depressed the primary inductor of the generator is disconnected from the grounding resistor 51 and connected to the appropriate polarizing voltage. Similarly the 4 hole generator is controlled by the fourth harmonic contact of key 43, by the second harmonic contact of key 44, and by the fundamental contact of key 45. Again if any of these keys is depressed the 4 hole generator is disconnected from the grounding resistor 51 and connected to the voltage, determined by the switches 49, of that harmonic which the 4 hole generator furnishes for the key which was depressed. Enough has been said to indicate the manner in which the C keys are connected with the C group of generators. The C sharp keys and the C sharp group of generators form a set of connections separate from the C keys except that the C sharp group derives its polarizing voltage from the same switches 49 and the secondary inductors of the C sharp generator group are also connected to the input grid of the amplifier 17. Similarly for the other notes of the scale. The secondary inductors of all the generators are permanently connected to the input grid of the amplifier 17 and thence through the potentiometer 19 to the loud speaker 18, but alternating voltage is supplied only by those generators whose primary inductors are charged. If the generators are built for 20 harmonics of each note then there will be 20 sets of contacts 46 on each key except those near the top of the scale, and 20 sets of resistors 50 and 51 and condensers 52 for each key except those near the top of the scale. There are, however, only 20 switches 49 for each manual of the organ as one switch regulates the voltage for all the fundamental frequencies, another switch regulates the voltage for all the second harmonic frequencies, etc. By setting the switches 47 the musician has absolute control of the steady state tone quality of the notes produced by the loud speaker 18. The different manuals of the organ use the same set of generators but each manual has a separate set of switches 49 for controlling the relative intensity of the harmonics. Thus while the lowest note played on one manual might consist mainly of fundamental, this same pitch played on another manual might be very rich in harmonics.

The purpose of condensers 52 in conjunction with resistors 50 and 51 is to regulate the attack on the notes as was previously pointed out in the explanation of Fig. 1*b*.

It is obvious from the connections of Fig. 4 that if two keys are simultaneously depressed two voltages may at the same time be applied to one of the primary inductors of a generator 47. In such case it is desirable that the resultant voltage should be approximately equal to the largest of the two. This result is achieved by placing resistors 53 in series with the voltage supply leads, the resistance in the higher voltage leads being less than the resistance in the lower voltage leads.

In the above description of the method of connecting the generators it has been assumed that there is only one generator of each of the required frequencies and that each generator may serve as a harmonic of several notes. It is obvious, however, that several pairs of inductors might be disposed tangentially along a single row of holes and thus serve as several separate generators of the same frequency without an increase in the number of discs required. In some cases this might be of advantage in simplifying the connections as each harmonic would have its own generator and no generator would be required to serve more than one purpose.

If it should be found that the relative phase of the various harmonics influences the tone quality, then each pair of inductors on the generators may be arranged to move a short distance tangentially from its normal position, as shown in dotted lines in Fig. 1*a*, and in this way the relative phases of the generated currents can be varied.

The amplifier may utilize as many stages as necessary and be of sufficient power to supply the necessary volume without harmful distortion. The loud speaker may be of any sort of suitable device for converting electrical energy into acoustical energy although it is preferable that it should have a minimum amount of resonance so that the response may be quick and free from frequency distortion. A good cone speaker, horn speaker, or Hewlett tone generator would be suitable. Its construction must be such as to allow it to handle the comparatively large energy.

I have previously stated that by properly shaping the inductor 11 (Fig. 1*b*) and adjusting its distance from the holes 9 a pure wave free from harmonics can be obtained. Such wave is expressed by a simple harmonic curve, and as it is perfectly simple, regular and symmetrical it is called a "sine curve". This premises, of course, a very accurate designing and proportioning of the holes 9 and inductor 11 as to relative shapes, dimensions and distance spacing. For practical purposes, however, it is not necessary that the wave produced be absolutely pure, i. e., truly sinusoidal, but only that it be substantially pure or substantially sinusoidal to suit the musical ear, since acoustically variations within a certain range from a pure tone will be found musically acceptable. If, for example, the inductor 11 is shaped as shown in Fig. 1*a* so that its width is equal to or but slightly exceeds the diameter of the holes 9 of predetermined circular design and diameter, a micrometric degree of spacing is unnecessary to obtain a wave form substantially free from harmonics, namely, a wave form, the harmonic content of which is less than 5%, the least amount of harmonic which the ear can detect and therefore representing a tone which is musically accepted as a pure tone and which is expressed by a simple harmonic curve.

In Figures 2*a*, 2*b* and 2*c*, the holes in discs 24, 25 and 26 describe small circles. The inductors which are associated with said holes are cylindrical. For all practical purposes, when the radius of hole 9 is small in comparison with the radius of the arc on which it travels and the radius of the circular end of associated circular secondary inductor is, (as shown), i. e., equal to or less than the radius of the hole, the current produced by the variance of the capacitance between the two changes as a function of time and will be substantially of a sinusoidal wave form.

What I claim is:

1. In combination, means of generating alternating currents of a multiplicity of frequencies, a loud speaker, and means for regulating as a function of the time the amount of current of any frequency supplied by said generating means to said loud speaker.

2. In combination, a multiplicity of alternating current generators, a loud speaker, means for starting and stopping the delivery of alternating current from any aforesaid generator to said loud speaker, and means for regulating the rate of starting of the aforesaid delivery of alternating current.

3. In combination, a multiplicity of alternating current generators, a loud speaker, means for starting and stopping the delivery of alternating current from any aforesaid generator to said loud speaker, means for regulating the rate of starting of the aforesaid delivery of alternating current, and means for regulating the rate of stopping of the aforesaid delivery of alternating current.

4. In combination, means of generating alternating currents of a multiplicity of frequencies, a loud speaker, and means including a resistance and a capacity for regulating as a function of the time the amount of current of any frequency supplied from said generating means to said loud speaker.

5. In combination, means of generating currents of a multiplicity of frequencies, means for regulating as a function of the time the amount generated of alternating current of each frequency, an amplifier, and a loud speaker.

6. In combination, means of generating alternating currents having the frequencies of the notes of the musical scale and their harmonics, means for regulating as a function of the time the amount generated of alternating current of each frequency, an amplifier, and a loud speaker.

7. In combination, a multiplicity of alternating current generators, means for amplifying alternating currents, means for starting and stopping the delivery of alternating current from any aforesaid generator to said amplifier, means for regulating the rate of starting and the rate of stopping of the aforesaid delivery of alternating current, and means for producing sounds from the amplified alternating currents.

8. In combination, a multiplicity of alternating current generators, generating the frequencies of the notes of the musical scale and their harmonics, means for amplifying the alternating currents generated by said generators, means for starting and stopping the delivery of alternating current from each aforesaid generator to said amplifier, means for regulating the rate of starting and the rate of stopping of the aforesaid delivery of alternating current, and a means for producing sounds from the amplified alternating currents.

9. In combination, a multiplicity of alternating current generators, a console, means for amplifying alternating currents, means controllable from said console for regulating as a function of the time the amount of alternating current delivered from any aforesaid generator to said amplifier, and means for producing sounds from the amplified alternating currents.

10. In combination, a multiplicity of alternating current generators generating the frequencies of the notes of the musical scale and their harmonics, a console, means for amplifying alternating currents, means controllable from said console for regulating as a function of the time the amount of alternating current delivered from any aforesaid generator to said amplifier, and means for producing sounds from the amplified alternating currents.

11. In combination, a multiplicity of electrostatic alternating current generators each of which comprises a moving member, a primary inductor, and a secondary inductor, the mutual electrostatic capacity between said primary and secondary inductors being periodically varied by said moving member; a console having several manuals of keys; separate means for each manual for controlling the charge on the primary inductor of any generator as a function of the time; means for amplifying the alternating currents produced by said generators; and means for producing sounds from the amplified currents.

12. In combination, a multiplicity of electrostatic alternating current generators each of which comprises a moving member, a primary inductor, and a secondary inductor, the mutual electrostatic capacity between said primary and secondary inductors being varied periodically by said moving member; means for controlling the charge on the primary inductor of any generator as a function of the time; means for amplifying the alternating currents produced by said generators; and means for producing sounds from the amplified currents.

13. In combination, a multiplicity of electrostatic alternating current generators each of which comprises a moving member, a primary inductor, and a secondary inductor, the mutual electrostatic capacity between said primary and secondary inductors being varied periodically by said moving member; a console; means for charging and discharging the primary inductors of said generators; means for controlling the rate of charge and discharge of any of said primary inductors; means for amplifying the alternating currents generated by said generators; means for producing sounds from the amplified currents; and means for controlling the amount of alternating current delivered by said amplifier to said sound producing means.

14. In combination, a multiplicity of electrostatic alternating current generators each of which comprises a moving member, a primary inductor, and a secondary inductor, the mutual electrostatic capacity between said primary and secondary inductors being varied periodically by said moving member; a console; means operable from said console for controlling the charge on any of the primary inductors of said generators; means for amplifying the alternating currents generated by said generators; means for producing sounds from the amplified alternating currents; and means for controlling the amount of alternating current delivered by said amplifier to said sound producing means.

15. In combination, a multiplicity of electrostatic alternating current generators each of which comprises an insulated primary conducting plate, an insulated secondary conducting plate, and a moving member so shaped and so placed as to periodically vary the mutual electrostatic capacity between said primary and secondary conducting plates; means for controlling the charge on the primary conducting plate of any generator as a function of the time; and means for producing sounds from the voltages induced on the secondary conducting plates.

16. In combination, a multiplicity of electrostatic alternating current generators each of which comprises an insulated primary conducting plate, an insulated secondary conducting plate, and means for periodically varying the mutual electrostatic capacity between said primary and secondary conducting plates; means for controlling the charge on the primary conducting plate of any generator as a function of the time; and means for producing sounds from the voltages induced on the secondary conducting plates.

17. In combination, a multiplicity of electrostatic alternating current generators each of which comprises an insulated primary conducting plate, an insulated secondary conducting plate, and means for periodically varying the mutual electrostatic capacity between said primary and secondary conducting plates; means for charging the primary conducting plate of any generator; means for utilizing part of the electrical energy induced on the secondary conducting plates.

18. In combination, an electrostatic alternating current generator comprising conducting members insulated from each other, means for periodically varying the mutual electrostatic capacity between said conducting members, means for charging an aforementioned conducting member, and means for utilizing the voltage fluctuations of a conducting member.

19. In combination, a multiplicity of electrostatic alternating generators comprising conducting members insulated from each other, means for periodically varying the mutual electrostatic capacity between said conducting members, means for controlling the charge on some aforementioned conducting members as a function of the time, an amplifier, and a loud speaker.

20. In a musical instrument, an electrical sound producer, an electrical circuit for controlling the operation of said sound producer, a multiplicity of capacity reactance assemblies, each of said capacity reactance assemblies comprising a pair of stator elements and an intermediate rotor element, and means for driving said rotor element for controlling the effective capacitive reactance of said electrical circuit at predetermined tone frequencies.

21. In a musical instrument, an electrical sound producer, an electrical circuit for controlling the operation of said sound producer and a plurality of varying capacity assemblies, said varying capacity assemblies each comprising a pair of stator elements having aligned capacity areas, and an intermediate rotary element apertured to alternately shield and expose said capacity areas one with respect to the other, and connections between said varying capacity assemblies with said electrical circuit and controlling the capacitive reactance thereof and correspondingly controlling the tone frequencies produced by said electrical sound producer.

22. In a system for the production of sound for musical expression, an electron tube system including an output circuit having an electrical sound producer connected therein for converting current impressed upon the circuit into audible sound; a source of potential; a plurality of continuously varying capacities providing different frequencies corresponding with the notes of a musical scale and interposed in the circuit between said source of potential and the input side of said output circuit; and means such as a key manual adapted to place one or more of said continuously varying capacities in circuit with said input side of the output circuit and including a system of key-actuated contacts for connecting the capacities with and disconnecting same from said source of potential; and means actuable by the contacts for controlling as a function of time, the rate of growth and decay of tones corresponding to the notes of said musical scale.

23. In an electrical musical instrument; an electrical sound producer; an electrical circuit for controlling the operation of the sound producer; a multiplicity of capacity reactance assemblies, each comprising a pair of stator elements and an intermeidate rotor element; and means for driving said rotor element for controlling the effective capacitive reactance of said electrical circuit at predetermined tone frequencies; the stator elements providing aligned capacity areas, the rotor element being apertured to alternately shield and expose said capacity areas, and said stator elements being adjustable relative to the apertures of the rotor element to enable the phase relations of the frequencies produced by said multiplicity of assemblies to be varied.

24. In an electrical musical instrument, an amplifying circuit; a source of electrical energy; groups of devices for producing electrical frequencies conforming to the frequencies of different tones of a musical scale, each said device comprising an inductor connected with the amplifying circuit and a rotatable member spaced apart from the inductor and apertured to alternately shield and expose the inductor, so as to produce an alternating voltage in the amplifying circuit of the frequency of a tone to be sounded; means for driving the rotary element at a predetermined speed; and means by which the device can be connected with said source of energy to electrically charge the device.

25. In an electrical musical instrument, an amplifying circuit; a source of electrical energy; and means for producing an alternating voltage of the frequency of a musical tone and comprising an inductor connected with the amplifying circuit so that current delivered to the inductor from said source can be impressed upon said circuit; a rotary element having apertures disposed relative to each other and to the inductor to alternately shield and expose same so that by rotation of said rotary element, an alternating voltage conforming to the frequency of said musical tone can be impressed upon said circuit; and means for driving the rotary element at a predetermined, constant speed.

26. A device for originating any prescribed wave-form, comprising a condenser and actuating means for continuously varying the capacitance of said condenser in accordance with said wave-form.

27. An electrical musical instrument for originating substantially sinusoidal waveforms translatable into sound, comprising a plurality of condensers, and actuating means for continuously varying the capacitance of each of said condensers by continuous unidirectional relative motion between parts thereof; the design of each of said condensers and the rate of said motion being such that the capacitances of said condensers vary substantially in accordance with sinusoidal waveforms and at harmonically related frequencies.

28. An electrical musical instrument for originating substantially sinusoidal waveforms translatable into sound, comprising a plurality of condensers, and rotary actuating means for varying the capacitance of each of said condensers by relative motion at a substantially uniform rate between parts thereof; the design of each of said condensers being such that the capacitances of said condensers vary substantially in accordance with sinusoidal waveforms and at harmonically related frequencies.

29. A device for originating a prescribed waveform of electric current, comprising a condenser and actuating means for continuously varying the capacitance of said condenser in accordance with said waveform by unidirectional relative motion between parts thereof; said capacitance being a periodic function of time analyzable into a constant component and a plurality of harmonically related sinusoidal components.

30. A device for originating a prescribed waveform of electric current, comprising a condenser and actuating means for continuously varying the capacitance of said condenser in accordance with said waveform; said capacitance being a periodic function of time analyzable into a constant component and a plurality of harmonically related sinusoidal components; said actuating means varying said capacitance by producing rotation of parts of said condenser relative to other parts thereof.

31. A device for originating any prescribed waveform, comprising a condenser, an electrode in said condenser, an element in said condenser, and actuating means for moving said element unidirectionally relative to said electrode, whereby the effective area of said electrode is continuously varied.

32. In a device for originating a prescribed waveform of electric current, comprising a condenser, an electrode in said condenser, an element in said condenser, and actuating means for moving said element unidirectionally relative to said electrode, whereby the effective area of said electrode is continuously varied; said capacitance being a periodic function of time analyzable into a constant component and a plurality of harmonically related sinusoidal components.

33. An electrical musical instrument for originating waveforms of electric current translatable into sound, comprising an electrical network, a plurality of condensers of variable capacitance, actuating means for continuously varying the capacitance of each of said condensers substantially in accordance with a sinusoidal waveform by maintaining continuous unidirectional relative motion between parts of each of said condensers, and a plurality of means for selecting said condensers and for imposing their combined effects upon said network.

34. A device for originating a prescribed waveform, comprising an electric circuit, means for producing current variations in said circuit, and electrical means for selecting said first means and for gradually varying its effect upon said circuit.

35. A device for originating prescribed complex periodic waveforms of potential, comprising a plurality of condensers, actuating means for varying the capacitance of each of said condensers by unidirectional relative motion between parts thereof, means for selecting said condensers by establishing electric circuit connections thereto, and an electrical network wherein electric currents may be caused to flow by said condensers upon operation of the selecting means; the capacitance variation of each of said condensers being substantially sinusoidal; the frequencies of capacitance variation of the condensers of said plurality being substantially integral multiples of a common fundamental frequency, and said waveforms of potential being produced by the synthesis of the potentials produced by individual condensers of said plurality upon operation of the selecting means.

36. A device for originating prescribed waveforms translatable into sound, comprising a plurality of groups of condensers, actuating means for varying the capacitances of said condensers in accordance with said waveforms by unidirectional relative motion between parts thereof, an electrical network, and electrical means for imposing the effects of said condensers upon said network; said condensers and groups characterized by the fact that all the condensers of each group have a common frequency of capacitance variation and by the fact that each condenser of a group has a different prescribed waveform of capacitance variation.

37. A device for originating a prescribed waveform, comprising an electric circuit, a condenser of variable capacitance adapted to vary the negative reactance in said circuit, actuating means for continuously varying the capacitance of said condenser in accordance with said waveform, a source of direct electromotive force for polarizing said condenser, and electrical means for selecting said condenser and for gradually varying the effect of said condenser upon said circuit; said electrical means comprising a pair of switch contacts and an impedance element for causing the magnitude of polarizing potential on said condenser to vary gradually following operation of said contacts.

38. A device for originating a prescribed waveform, comprising an electric circuit, a condenser of variable capacitance adapted to vary the negative reactance in said circuit, actuating means for continuously varying the capacitance of said condenser in accordance with said waveform, a source of direct electromotive force for polarizing said condenser, and electrical means for selecting said condenser and for gradually varying the effect of said condenser on said circuit; said electrical means comprising a pair of switch contacts, and an impedance element for causing the magnitude of polarizing potential on said condenser to approach a final value asymptotically following operation of said contacts.

39. A device for originating prescribed waveforms, comprising an electric circuit, condensers of variable capacitance for varying the negative reactance in said circuit, actuating means for continuously varying the capacitances of said condensers in accordance with said waveforms, a common source of direct electromotive force for polarizing said condensers, and electrical means for selecting each of said condensers and for gradually varying the effect of the selected condenser upon said circuit; said electrical means comprising at least two circuit branches; one of said branches including a condenser and being such as to suppress sudden changes in potential drop across itself, and another of said branches including a resistance element and a switch and being such as to conduct direct current upon closure of said switch.

40. A device for originating a prescribed waveform translatable into sound, comprising an electric circuit, a condenser of variable capacitance adapted to vary the negative reactance in said circuit, actuating means for continuously varying the capacitance of said condenser in accordance with said waveform, and electrical means for polarizing said condenser, for selecting said condenser, and for gradually varying the effect of said condenser upon said circuit; said electrical means comprising a time-delay condenser, a source of direct electromotive force for charging said time-delay condenser through a resistance whereby the charging occurs gradually, and a circuit branch containing a resistance and adapted to be shunted around said second condenser, whereby said second condenser is gradually discharged and polarization is removed from said first condenser.

41. An electrical musical instrument adapted to originate prescribed complex waveforms of potential, said instrument comprising a plurality of condensers, actuating means for varying the capacitance of each of said condensers by unidirectional relative motion between parts thereof, means for selecting said condensers by establishing electric circuit connections thereto, and an electrical network wherein electric currents may be caused to flow by said condensers upon operation of the selecting means; the capacitance variation of each of said condensers being substantially sinusoidal; the frequencies of capacitance variation of the condensers of said plurality being substantially integral multiples of a common fundamental frequency, and said waveforms of potential being produced by the synthesis of the potentials produced by individual condensers of said plurality upon operation of the selecting means.

42. A device for originating waveforms translatable into sound, comprising a plurality of condensers each having two terminals, actuating means for continuously varying the capacitances of said condensers in accordance with said waveforms, a source of polarizing electro-motive force for said condensers, a coupling element having a plurality of terminals, and means for selecting said condensers and for completing circuit branches between a treminal of said element and a terminal of one of said condensers.

43. A device for originating a prescribed waveform, comprising a condenser, actuating means for continuously varying the capacitance of said condenser in accordance with said waveform, a vacuum-tube system, an input circuit for supplying to the input terminals of said system an electromotive force translatable into sound, a source of potential for polarizing said condenser, and a coupling element for coupling said circuit and said system; said circuit including said condenser, said source, and said element in series with one another.

44. A device for originating a prescribed waveform, comprising a circuit, a plurality of condensers of variable capacitance in said circuit for varying the negative reactance therein, and actuating means for continuously varying the capacitance of said condensers in accordance with said waveform.

45. A device for originating a prescribed waveform, comprising a circuit, a plurality of condensers, of variable capacitance, actuating means for continuously varying the capacitances of said condensers in accordance with prescribed waveforms, and means for selecting said condensers and for imposing their combined effect upon said circuit to produce said first waveform.

46. A device for originating a prescribed waveform, comprising a circuit, a condenser of variable capacitance in said circuit for varying the negative reactance therein, actuating means for continuously varying the capacitance of said condenser in accordance with said waveform, and an electrical amplifier connected to said circuit.

47. A device for originating a prescribed waveform comprising a circuit, a condenser of variable capacitance in said circuit for varying the negative reactance therein, actuating means for continuously varying the capacitance of said condenser in accordance with said waveform, an electrical amplifier connected to said circuit, and a sound translating device connected to said amplifier.

48. A device for originating a prescribed waveform, comprising a circuit, a condenser of variable capacitance adapted to vary the negative reactance in said circuit, actuating means for continuously varying the capacitance of said condenser in accordance with said waveform, and electrical means for selecting said condenser and for gradually varying the effect of said condenser upon said circuit.

49. A device for originating waveforms translatable into sound, comprising an electric circuit, condensers of variable capacitance for varying the negative reactance in said circuit and for producing in said circuit potentials translatable into sound, actuating means for varying the capacitances of said condensers, a common source of direct electromotive force for polarizing said condensers, and electrical means for selecting each of said condensers and for gradually varying the effect of the selected condenser upon said circuit; said electrical means comprising at least two branches; one of said branches including a time-delay condenser and being such as to suppress sudden changes of potential drop across itself, and another of said branches including a resistance element, a pair of contacts, and a control switch adapted to coact with said contacts.

50. In an electrical instrument an electrical network having therein a plurality of means for producing frequency variations of current, a plurality of groups of selectors, and a frequency-selective control for regulating the relative current intensities for each of said groups.

51. In combination, a multiplicity of sources of alternating current, means for amplifying the alternating currents delivered from said sources, means for starting and stopping the delivery of alternating current from any one of said sources to said amplifying means, means for regulating the rate of starting and the rate of stopping of the aforesaid delivery of alternating current, and means controllable from a console for determining which of said sources shall deliver alternating current to said amplifying means and for predetermining the intensity of said current.

52. In an electrical musical instrument, a manual including a number of different keys, a set of switches operated by each key, a plurality of sources of alternating current, an electrical network in which switches of different sets are connected with a single one of said sources, an amplifier in said network, means actuable from a console for determining which of said sources shall be effective in the network to conduct alternating current to said amplifier upon depression of said keys and for determining the intensity of said current, a sound producer actuable by said amplifier, and means for controlling the amount of alternating current delivered by said amplifier to said sound producer.

53. In an electrical musical instrument, a manual including a number of different keys, a set of switches operated by each key, a source of alternating current, electrical connections between said source and several switches, each of a different set, a plurality of additional sources of alternating current of different frequencies, electrical connections between said additional sources and other switches of said sets of switches, and means for regulating as a function of time the amount of alternating current conducted to an amplifier from any of said sources.

54. In an electrical musical instrument, a manual including a number of keys, a set of switches operated by each key, a plurality of sources of alternating current of different tone frequencies, electrical connections between each of said sources and different switches of a plurality of said sets of switches, and means for gradually varying the effect of any source upon an electrical network upon depression of a key.

55. In an electrical musical instrument, the combination of a plurality of sources of alternating current, each of a different tone frequency, a conductor common to said sources, key controlled means to deliver current to said common conductor from selected ones of said sources, means connected to said conductor for translating electrical currents into sound, means to change the relative proportions of the currents delivered to said conductor from preselected ones of said sources, and means for regulating as a function of time the rate at which the intensity of tones grows and decays of the translating means.

56. In an electrical musical instrument, mechanism for altering the tone quality of the instrument comprising a plurality of manually actuable circuit controlling devices for determining the number and relative intensities of harmonically related tone frequencies required for the production of a desired quality of tone, each of said devices adapted for independent actuation to a number of different positions corresponding to different degrees of intensity of a particular harmonic or fundamental and means for regulating as a function of time the rate at which the intensity of tones produced by the instrument grows and decays.

57. An electrical musical instrument comprising a plurality of alternating current sources for originating alternating currents of different tone frequencies, means enabling a plurality of said sources to be used for the production of a complex tone, and means for varying the phase relation of said alternating currents.

FLOYD A. FIRESTONE.